(12) United States Patent
Ebben et al.

(10) Patent No.: US 11,306,836 B2
(45) Date of Patent: Apr. 19, 2022

(54) VARIABLE FLOW POPPET VALVE

(71) Applicant: Graco Minnesota Inc., Minneapolis, MN (US)

(72) Inventors: James R. Ebben, Shoreview, MN (US); Anthony J. Kuschel, Coon Rapids, MN (US); Michael E. Bloom, Anoka, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 339 days.

(21) Appl. No.: 16/624,754

(22) PCT Filed: Jun. 22, 2018

(86) PCT No.: PCT/US2018/039028
§ 371 (c)(1),
(2) Date: Dec. 19, 2019

(87) PCT Pub. No.: WO2018/237283
PCT Pub. Date: Dec. 27, 2018

(65) Prior Publication Data
US 2021/0140552 A1 May 13, 2021

Related U.S. Application Data

(60) Provisional application No. 62/523,845, filed on Jun. 23, 2017.

(51) Int. Cl.
*F16K 1/38* (2006.01)
*F16K 39/02* (2006.01)
(Continued)

(52) U.S. Cl.
CPC .............. *F16K 17/04* (2013.01); *F16K 1/385* (2013.01); *F16K 27/0254* (2013.01); *F16K 39/024* (2013.01)

(58) Field of Classification Search
CPC ...... F16K 17/04; F16K 1/385; F16K 27/0254; F16K 39/024; F16K 1/34; F16K 2200/202; B05B 1/3013
See application file for complete search history.

(56) References Cited

U.S. PATENT DOCUMENTS

| 2,351,035 A | 6/1944 | Grant, Jr. et al. |
| 2,886,061 A | 5/1959 | Smith et al. |
| (Continued) | | |

FOREIGN PATENT DOCUMENTS

| CN | 1938513 A | 3/2007 |
| CN | 201330667 Y | 10/2009 |
| (Continued) | | |

OTHER PUBLICATIONS

First Indonesia Office Action for ID Application No. P00202000292, dated Jun. 24, 2021, pp. 8.

(Continued)

*Primary Examiner* — Marina A Tietjen
(74) *Attorney, Agent, or Firm* — Kinney & Lange, P. A.

(57) ABSTRACT

A variable flow poppet valve includes a first stage, a second stage, a bushing disposed in the second stage, and a cap configured to actuate the valve open. The first stage includes an inner valve plug having a head with a first tapered portion and a shaft extending downstream from the head, and a first stage spring disposed within the bushing and extending around the shaft. The shaft is attached to the cap to allow the cap to actuate the inner valve plug to the open position. The second stage includes an outer valve plug having an upstream portion and a second tapered portion extending downstream from the upstream portion. The bushing includes a shoulder, and the cap is configured to engage the shoulder to actuate the outer valve plug to the open position.

20 Claims, 8 Drawing Sheets

(51) Int. Cl.
  *B05B 1/30* (2006.01)
  *F16K 17/04* (2006.01)
  *F16K 27/02* (2006.01)

(56) References Cited

U.S. PATENT DOCUMENTS

| | | | |
|---|---|---|---|
| 3,817,285 | A | 6/1974 | Wilder et al. |
| 4,596,278 | A | 6/1986 | Fink, Jr. |
| 5,271,599 | A | 12/1993 | Kolchinsky et al. |
| 5,465,751 | A | 11/1995 | Newton |
| 5,752,659 | A | 5/1998 | Moncelle |
| 6,019,115 | A | 2/2000 | Sanders |
| 7,921,880 | B2 | 4/2011 | Jackson et al. |
| 8,262,057 | B2 | 9/2012 | Lin et al. |
| 2012/0060941 | A1 | 3/2012 | Roman |
| 2014/0312257 | A1 | 10/2014 | Marica |
| 2015/0027549 | A1 | 1/2015 | Murray |
| 2015/0345406 | A1 | 12/2015 | Pelfrey et al. |
| 2017/0023148 | A1 | 1/2017 | Des Garennes et al. |

FOREIGN PATENT DOCUMENTS

| | | |
|---|---|---|
| DE | 515502 C | 1/1931 |
| DE | 1130235 B | 5/1962 |
| EP | 1688339 A1 | 8/2006 |
| EP | 2395267 A2 | 12/2011 |
| JP | 2001248740 A | 9/2001 |
| KR | 101373366 B1 | 3/2014 |
| RU | 2028530 C1 | 2/1995 |
| WO | WO2015137993 A1 | 9/2015 |

OTHER PUBLICATIONS

Extended European Search Report for EP Application No. 18819880.8, dated Feb. 22, 2021, pp. 6.
International Preliminary Report on Patentability for PCT Application No. PCT/US2018/039028, dated Jan. 2, 2020, pp. 6.
International Search Report and Written Opinion for International Application No. PCT/US2018/039028, dated Nov. 27, 2018, 9 pages.
First Chinese Office Action for CN Application No. 201880042094.5, dated Jun. 30, 2021, pp. 8.

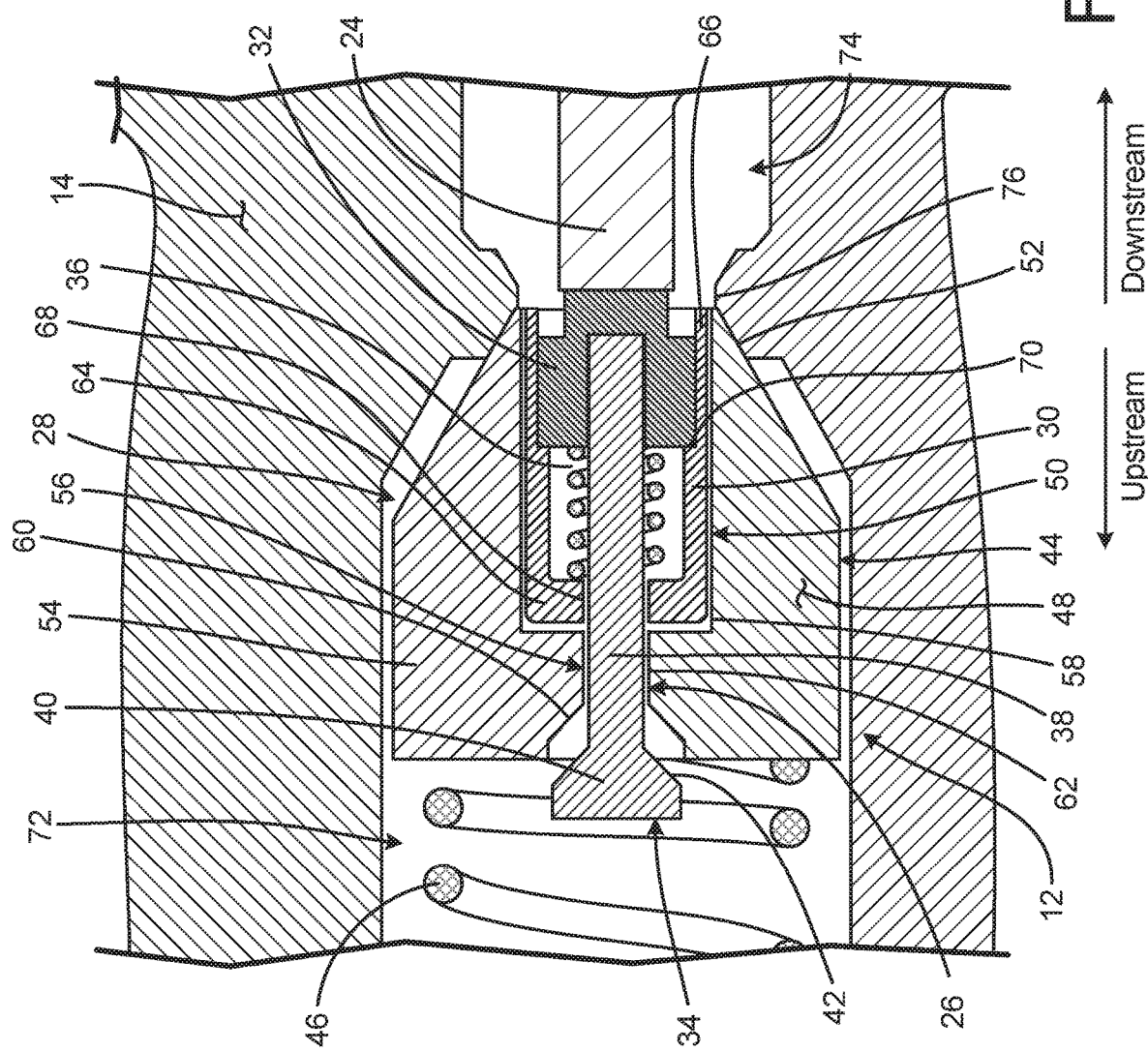

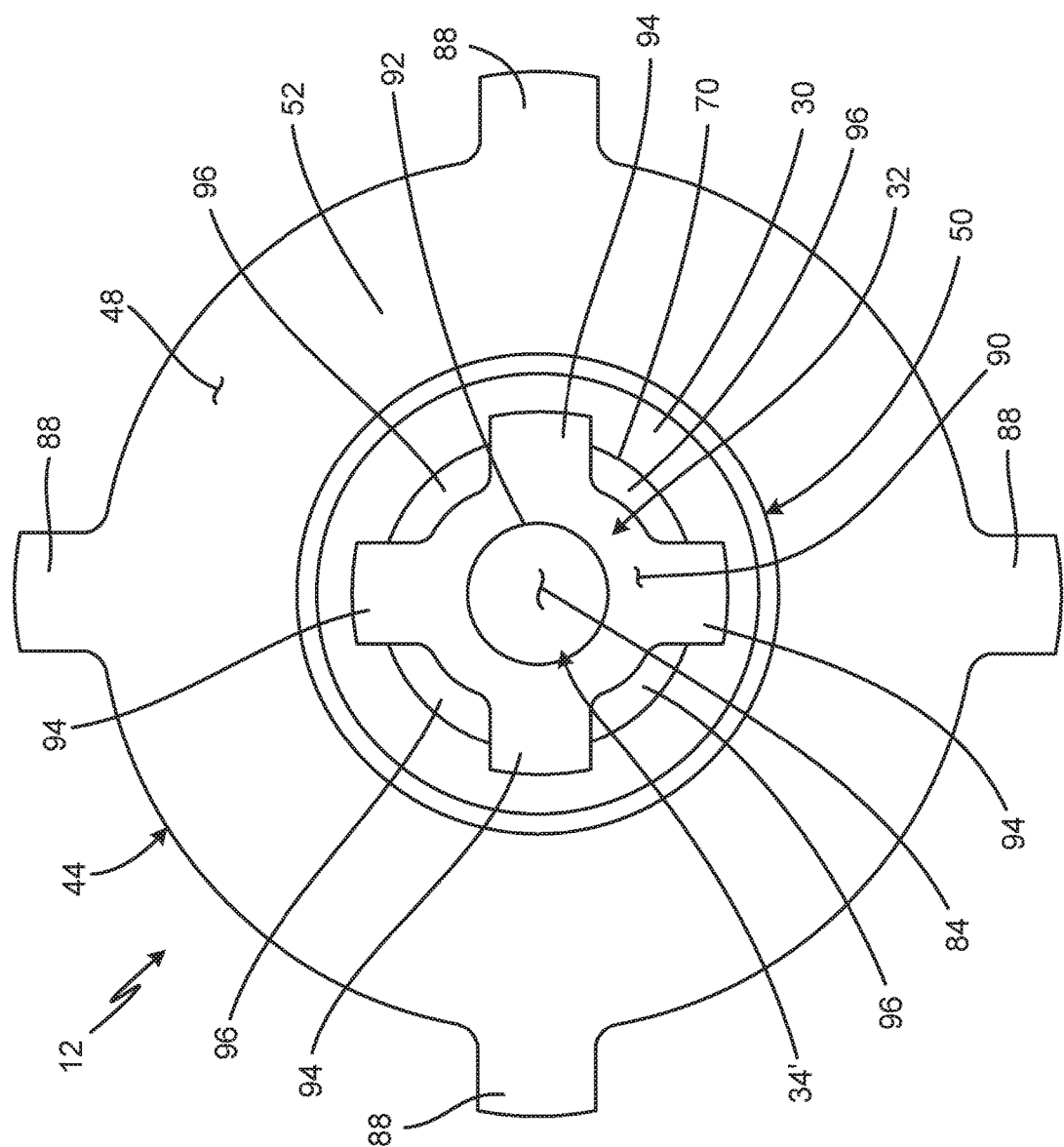

VARIABLE FLOW POPPET VALVE

CROSS-REFERENCE TO RELATED APPLICATION

This application claims priority to U.S. Provisional Application No. 62/523,845 filed Jun. 23, 2017, and entitled "VARIABLE FLOW POPPET VALVE," the disclosure of which is hereby incorporated in its entirety.

BACKGROUND

This disclosure relates generally to valves. More specifically, this disclosure relates to a variable flow poppet valve for a fluid dispensing system.

Fluid dispensing systems, such as those used to dispense oil and other lubricants in automotive shops, utilize dispensing nozzles to control dispensing of pressurized fluids. The dispensing nozzles include an internal valve that is actuated by the user to control the flow. The user mechanically actuates the internal valve between a closed position and an open position by depressing a trigger. The fluid upstream of the valve is pressurized, and that fluid pressure drives the fluid downstream past the valve when the valve is in the open position. The upstream fluid pressure resists movement of the valve from the closed position to the open position such that the user is required to exert a large force to overcome the upstream fluid pressure and actuate the valve to the open position. In addition, the valve typically provides binary flow rates, such that the fluid either is flowing, when the valve is open, or is not flowing, when the valve is not flowing. Where the valve is a two-stage valve, the valve offers two distinct flow rates, a low flow rate where the first stage is open, and a high flow rate where the second stage is open.

SUMMARY

According to an aspect of the disclosure, a variable flow valve includes an outer valve plug, a bushing, an inner valve plug, and a cap. The outer valve plug includes a valve plug body having an upstream portion and an outer plug tapered portion extending from the upstream portion, and a plug passage extending through the valve plug body. The plug passage includes a first segment extending into the upstream portion of the valve plug body and including a first stage seat, and a second segment extending from the first segment. The bushing is disposed in the second segment and includes an upstream end having a shaft opening, a downstream end, and a shoulder extending radially inward and disposed between the upstream end and the downstream end. The inner valve plug is disposed within the plug passage and extends into the bushing through the shaft opening. The inner valve plug includes a head having an inner plug tapered portion configured to mate with the first stage seat, and a shaft extending from the head through the shaft opening. The cap is attached to the shaft and disposed within the bushing. The cap is configured to actuate the inner valve plug between a first stage closed position and a first stage open position and is configured to engage the shoulder of the bushing to actuate the outer valve plug between a second stage closed position and a second stage open position.

According to another aspect of the disclosure, a nozzle for dispensing fluid includes a nozzle body defining an upstream fluid chamber and a downstream fluid chamber, an outer valve sat extending radially inward from the nozzle body between the upstream fluid chamber and the downstream fluid chamber, and a variable flow valve disposed within the nozzle body. The variable flow valve is movable between a fully closed position, a partially open position, and a fully open position. The variable flow valve includes an outer valve plug, a second stage spring disposed within the upstream fluid chamber and configured to bias the outer valve plug towards the outer valve seat, a bushing, an inner valve plug, a cap, and a first stage spring. The outer valve plug includes a valve plug body having an upstream portion and an outer plug tapered portion extending from the upstream portion and configured to mate with the outer valve seat and a plug passage extending through the valve plug body and including a first stage seat. The bushing is disposed in the plug passage. The inner valve plug is disposed within the plug passage and extends into the bushing. The inner valve plug includes a head having an inner plug tapered portion configured to mate with the first stage seat and a shaft extending from the head and into the bushing. The cap is attached to the shaft and disposed within the bushing. The first stage spring is disposed within the bushing and around the shaft and extends between the upstream end of the bushing and the cap. The cap is configured to actuate the variable flow valve from the fully closed position to the partially open position, where the inner valve plug is displaced from the first stage seat, and from the partially open position to the fully open position, where the outer valve plug is displaced from the outer valve seat.

BRIEF DESCRIPTION OF THE DRAWINGS

FIG. 1C is a cross-sectional view of the variable flow poppet valve of FIG. 1B in a partially open position.

FIG. 2B is an elevation view of a downstream end of the variable flow poppet valve of FIG. 2A.

DETAILED DESCRIPTION

Figure 1A:
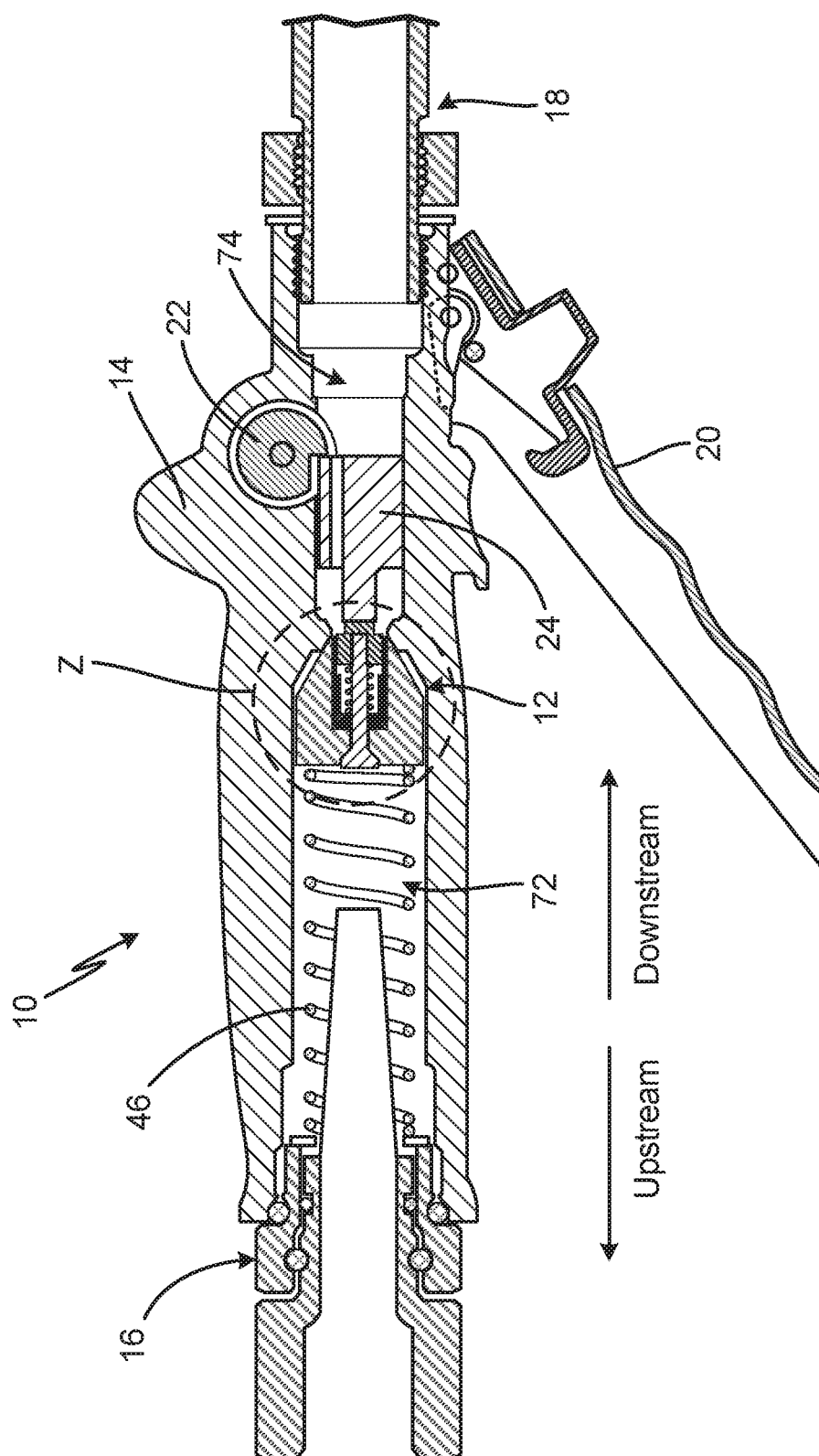
FIG. 1A is a cross-sectional view of a nozzle assembly.
Figure 1B:
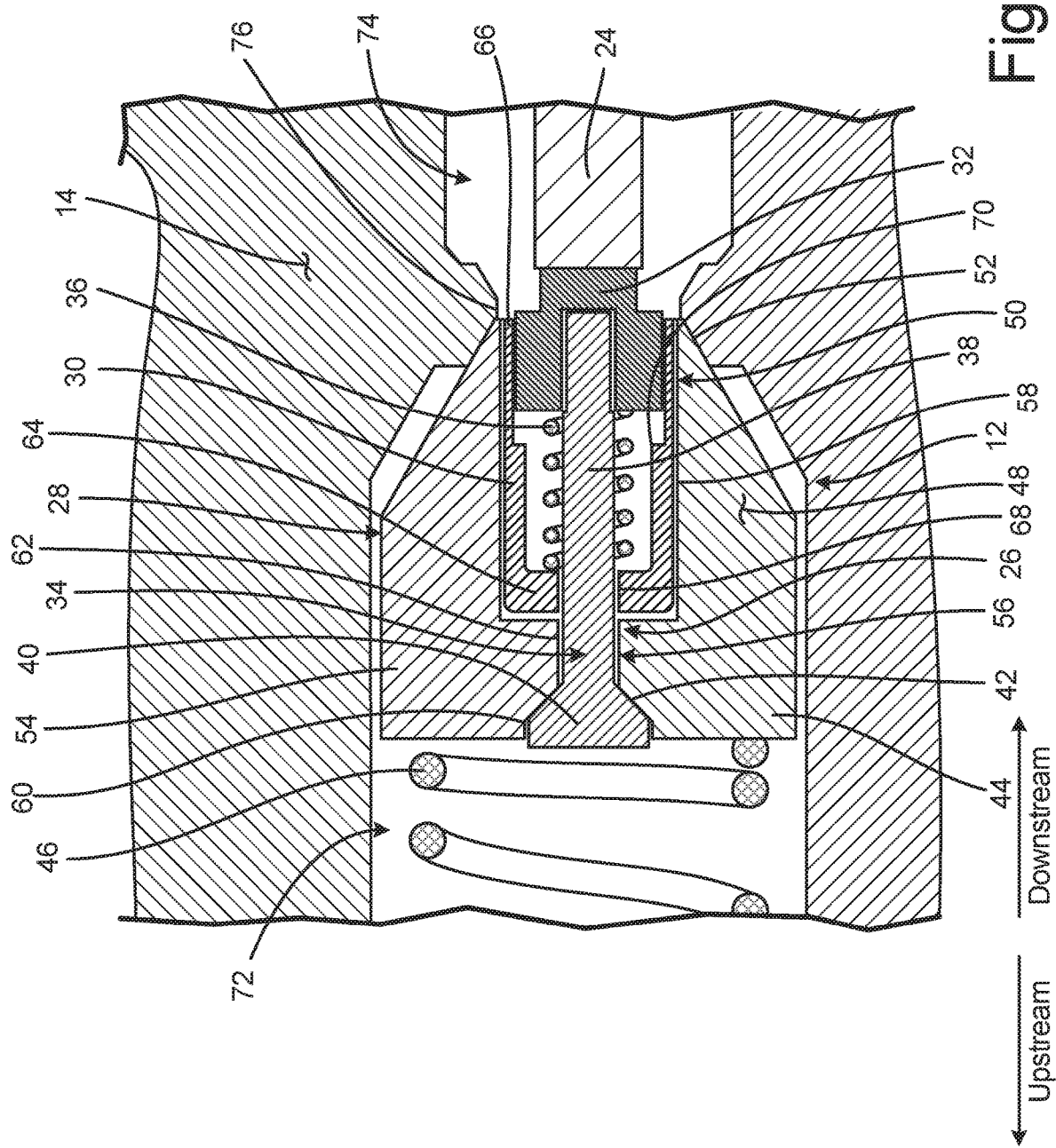
FIG. 1B is an enlarged cross-sectional view of detail Z in FIG. 1A showing a variable flow poppet valve in a closed position.
Figure 1D:
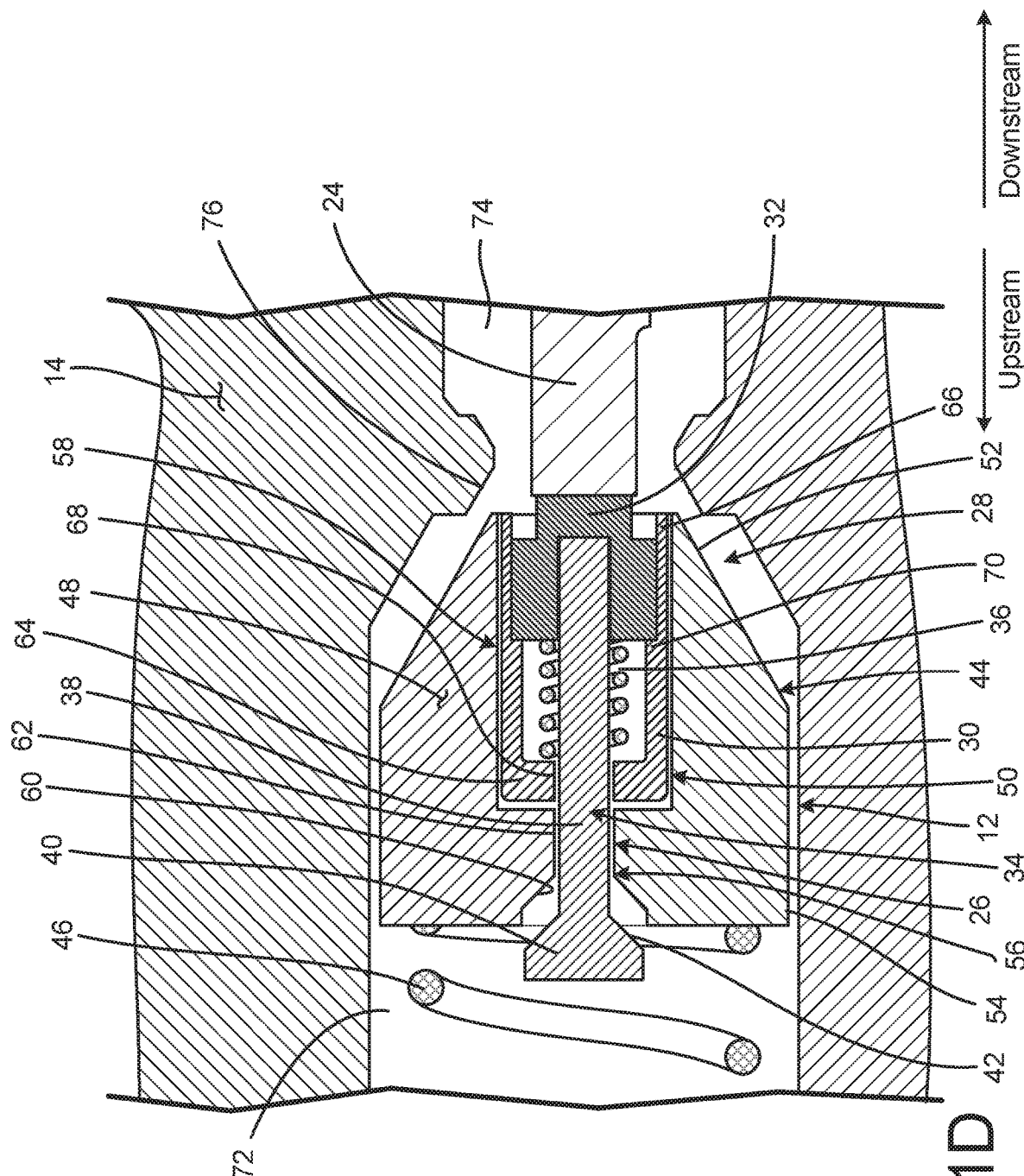
FIG. 1D is a cross-sectional view of the variable flow poppet valve of FIG. 1B in a fully open position.

FIG. 1A is a cross-sectional view of nozzle 10, which is configured to dispense pressurized fluid such as oil, antifreeze, transmission fluid, and/or lubricant, among other options. FIG. 1B is an enlarged cross-sectional view detail Z in FIG. 1A showing variable flow poppet valve (VFPV) 12 in a closed position. FIG. 1C is a cross-sectional view showing VFPV 12 in a partially open position. FIG. 1D is a cross-sectional view of VFPV 12 in a fully open position. FIGS. 1A-1D will be discussed together.

Nozzle 10 includes VFPV 12, nozzle body 14, inlet fitting 16 (FIG. 1A), outlet fitting 18 (FIG. 1A), trigger 20 (FIG. 1A), cam 22 (FIG. 1A), and push rod 24. VFPV 12 includes first stage 26, second stage 28, bushing 30, and cap 32. First stage 26 includes inner valve plug 34 and first stage spring 36. Inner valve plug 34 includes shaft 38 and head 40, which is frustoconical and includes first tapered surface 42. Second stage 28 includes outer valve plug 44 and second stage spring 46. Outer valve plug 44 includes outer plug body 48 and plug passage 50. Outer plug body 48 includes second tapered surface 52 and upstream portion 54. Plug passage 50 includes first segment 56 and second segment 58. First segment 56 includes first stage seat 60 and intermediate portion 62. Bushing 30 includes upstream end 64, downstream end 66, shaft opening 68, and shoulder 70. Nozzle body 14 includes upstream fluid chamber 72, downstream fluid chamber 74, and second stage seat 76. The upstream arrow and the downstream arrow indicate the upstream direction and the downstream direction, respectively.

Inlet fitting 16 is attached to nozzle body 14 and provides fluid to upstream fluid chamber 72. Outlet fitting 18 is attached to nozzle body 14 and receives the fluid from downstream fluid chamber 74. VFPV 12 is disposed within nozzle body 14 between upstream fluid chamber 72 and downstream fluid chamber 74 and is configured to control the fluid flow between upstream fluid chamber 72 and downstream fluid chamber 74. Push rod 24 is disposed in downstream fluid chamber 74 and actuates VFPV 12 between the closed position (shown in FIG. 1B), the partially open position (shown in FIG. 1C), and the fully open position (shown in FIG. 1D). Cap 32 is attached to inner valve plug 34 and extends into downstream end 66 of bushing 30. Push rod 24 interfaces with cap 32 and is configured to drive cap 32 in the upstream direction. While push rod 24 is described as interfacing with cap 32, it is understood that, in some examples, the downstream end of cap 32 is attached to push rod 24. Cap 32 can be secured to push rod 24 in any desired manner. For example, cap 32 can include threading configured to mate with threading on push rod 24. It is understood, however, that cap 32 can be permanently or removably attached to push rod 24 in any desired manner, such as by a press fit connection, with an adhesive, or by welding. In some examples, cap 32 can be integral with push rod 24. Trigger 20 is pivotably attached to nozzle body 14 and is linked to cam 22. Cam 22 is disposed in nozzle body 14 and is configured to rotate to drive push rod 24 in the upstream direction to actuate VFPV 12.

Second stage seat 76 extends from and is integral with nozzle body 14. Second stage seat 76 is a chamfered bore in nozzle body 14. While second stage seat 76 is described as integral with nozzle body 14, it is understood that second stage seat 76 can be formed separately from nozzle body 14 and installed within nozzle body 14. Outer valve plug 44 is disposed in nozzle body 14 and is configured to abut second stage seat 76 when in the closed position. Upstream portion 54 of outer plug body 48 aligns outer valve plug 44 within nozzle body 14. Second tapered surface 52 extends downstream from upstream portion 54 and is configured to interface with second stage seat 76. Second stage spring 46 is disposed within upstream fluid chamber 72 and extends between inlet fitting 16 and upstream portion 54 of outer valve plug 44.

Plug passage 50 extends through outer plug body 48 and defines a flowpath for the fluid flowing through first stage 26. First segment 56 of plug passage 50 is disposed upstream of second segment 58 of plug passage 50. First stage seat 60 is a chamfered portion of first segment 56 and is disposed at the upstream end of first segment 56. Intermediate portion 62 extends downstream from first stage seat 60 to second segment 58 of plug passage 50. Second segment 58 presents a larger diameter than intermediate portion 62. Bushing 30 is disposed in second segment 58 of plug passage 50. Shaft opening 68 extends through upstream end 64 of bushing 30 and, in some examples, shaft opening 68 has substantially the same diameter as intermediate portion 62. Shoulder 70 extends radially inward from bushing 30 between upstream end 64 and downstream end 66.

Inner valve plug 34 extends through plug passage 50 and into bushing 30 through shaft opening 68. Head 40 includes first tapered surface 42, and first tapered surface 42 is configured to interface with first stage seat 60. Shaft 38 extends in the downstream direction from head 40. Shaft 38 extends through intermediate portion 62 and into bushing 30 through shaft opening 68. A downstream end of shaft 38 is connected to cap 32. Shaft 38 can be connected to cap 32 in any desired manner, such as a threaded connection or a press fit connection. First stage spring 36 is disposed within bushing 30 around shaft 38. First stage spring 36 extends between upstream end 64 of bushing 30 and cap 32.

Nozzle body 14 is cast from a metal, such as aluminum or stainless steel, among other options. Outer valve plug 44 is formed from an elastomeric material such that outer valve plug 44 forms a fluid tight seal with nozzle body 14 when outer valve plug 44 engages second stage seat 76. Outer valve plug 44 can be formed from any desired elastomer compatible with the fluid being dispensed and capable of forming a seal with second stage seat 76, such as a thermoplastic elastomer. For example, outer valve plug 44 can be formed from an ethylene propylene diene monomer (EPDM) rubber, such as Santoprene™. Inner valve plug 34 is formed from a metallic material configured form a fluid tight seal with outer valve plug 44, such as aluminum or stainless steel.

First stage 26 of VFPV 12 is configured to actuate to an open position prior to second stage 28 actuating to an open position. First stage spring 36 has a lower spring rate than second stage spring 46 to ensure that inner valve plug 34 shifts to the open position before outer valve plug 44 shifts to the open position. During operation, VFPV 12 is initially in the fully closed position shown in FIG. 1B. The user controls the flow of fluid through nozzle 10 with trigger 20. To initiate the fluid flow through nozzle 10 the user depresses trigger 20, which causes cam 22 to rotate and drive push rod 24 in the upstream direction. Push rod 24 drives cap 32 in the upstream direction due to the connection of cap 32 and push rod 24. Cap 32 drives inner valve plug 34 in the upstream direction such that head 40 disengages from first stage seat 60 and first stage spring 36 is compressed between cap 32 and the upstream end of bushing 30. Head 40 disengaging from first stage seat 60 opens a flowpath between first tapered surface 42 and first stage seat 60, and the fluid begins flowing downstream through plug passage 50. The fluid flows through the flowpath between first tapered surface 42 and first stage seat 60, flows through intermediate portion 62 and enters bushing 30 through shaft opening 68. The fluid flows through bushing 30 and exits VFPV 12 through cap 32, as explained in more detail below with regard to FIGS. 2A-2C.

As head 40 is displaced from first stage seat 60, the volume of the flowpath between first tapered surface 42 and first stage seat 60 increases. As the volume of the flowpath increases the flow rate through first stage 26 similarly increases. The profile of first tapered surface 42 and first stage seat 60 provides the variable flow rate such that the flow through first stage is not binary, but instead can be controlled by the user. As such, the user controls the flow rate of the fluid to downstream fluid chamber 74 by controlling the distance that head 40 is displaced from first stage seat 60 by depressing trigger 20. Opening first stage 26 also causes a pressure drop in upstream fluid chamber 72. The fluid pressure in upstream fluid chamber 72 continues to drop as the flow rate through first stage 26 increases. The decreased fluid pressure in upstream fluid chamber 72 ensures that significantly less force is required to actuate VFPV 12 to the fully open position shown in FIG. 1D.

Push rod 24 continues to drive cap 32 in the upstream direction until cap 32 engages shoulder 70 of bushing 30. First stage 26 is fully open when cap 32 engages shoulder 70. Throughout the actuation of first stage 26 second tapered surface 52 remains engaged with second stage seat 76 such that such that second stage 28 is closed. As such, with VFPV 12 in the partially open position shown in FIG. 1C the fluid flows through first stage 26 but is prevented from flowing through second stage 28.

The user can further increase the flow rate through VFPV 12 by actuating VFPV 12 from the partially open position shown in FIG. 1C to the fully open position shown in FIG. 1D. The user actuates VFPV 12 to the fully open position by further depressing trigger 20. Cam 22 drives push rod 24 further upstream. Cap 32 exerts a force on shoulder 70 of bushing 30 to thereby drive outer valve plug 44 in the upstream direction. With second tapered surface 52 disengaged from second stage seat 76 a flowpath is opened through second stage 28 between second tapered surface 52 and second stage seat 76. The fluid flows from upstream fluid chamber 72 to downstream fluid chamber 74 through both first stage 26 and second stage 28. Similar to the flow rate through first stage 26, the flow rate through second stage 28 is controlled by controlling the distance that outer valve plug 44 is displaced from second stage seat 76 by depressing trigger 20. As discussed above, the fluid pressure in upstream fluid chamber 72 decreases when first stage 26 is opened, such that less force is required to actuate second stage 28 to the open position. Because less force is required to actuate second stage 28 to the open position, the user has greater control over the actuation of second stage 28.

After the fluid dispense event is complete, VFPV 12 shifts back to the fully closed position shown in FIG. 1B. The user releases the trigger 20 such that cam 22 returns to the position shown in FIG. 1A. Second stage spring 46 drives outer valve plug 44 from the position shown in FIG. 1D to the position shown in FIG. 1C, such that second tapered surface 52 engages second stage seat 76, thereby closing the flowpath through second stage 28. First stage spring 36 drives cap 32, and thus push rod 24, in the upstream direction and back to the position shown in FIG. 1B. Cap 32 pulls inner valve plug 34 back to the closed position shown in FIG. 1B due to the connection of shaft 38 and cap 32. Head 40 reengages with first stage seat 60, thereby closing the flowpath through first stage 26. With head 40 engaging first stage seat 60 and second tapered surface 52 engaging second stage seat 76 VFPV 12 is in the fully closed position and the fluid is prevented from flowing from upstream fluid chamber 72 to downstream fluid chamber 74.

VFPV 12 provides significant advantages. First stage spring 36 has a lower spring rate than second stage spring 46, thereby ensuring that inner valve plug 34 shifts to the open position prior to second valve plug shifting to the open position. Shifting inner valve plug 34 to the open position causes a pressure drop in upstream fluid chamber 72, thereby reducing the force required to shift outer valve plug 44 to the open position. As such, the user has greater control over the flow rate through second stage 28. In addition, outer valve plug 44 seals directly on nozzle body 14, and inner valve plug 34 seals directly on outer valve plug 44, thereby reducing the number of parts and simplifying manufacturing and assembly. Inner valve plug 34 includes first tapered surface 42, which allows the user to variably control the flow rate through first stage 26 by controlling the distance between head 40 and first stage seat 60. Outer valve plug 44 includes second tapered surface 52, which further allows the user to variably control the flow rate by controlling the distance between second tapered surface 52 and second stage seat 76. As such, VFPV 12 allows the user to precisely control the flow rate through nozzle 10, which provides better control, increases user confidence, and reduces material waste.

Figure 2A:
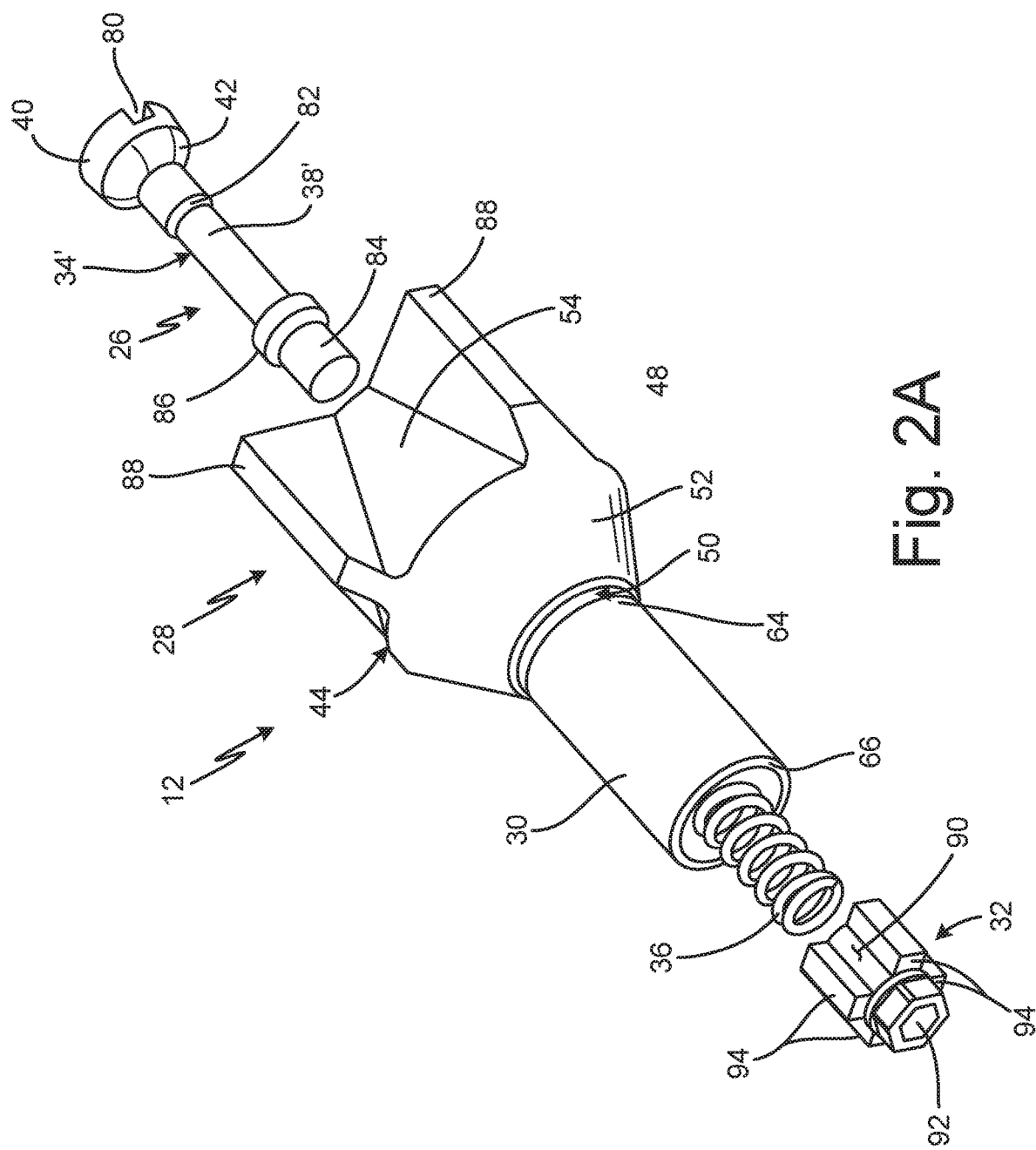
FIG. 2A is an exploded view of a variable flow poppet valve.
Figure 2C:
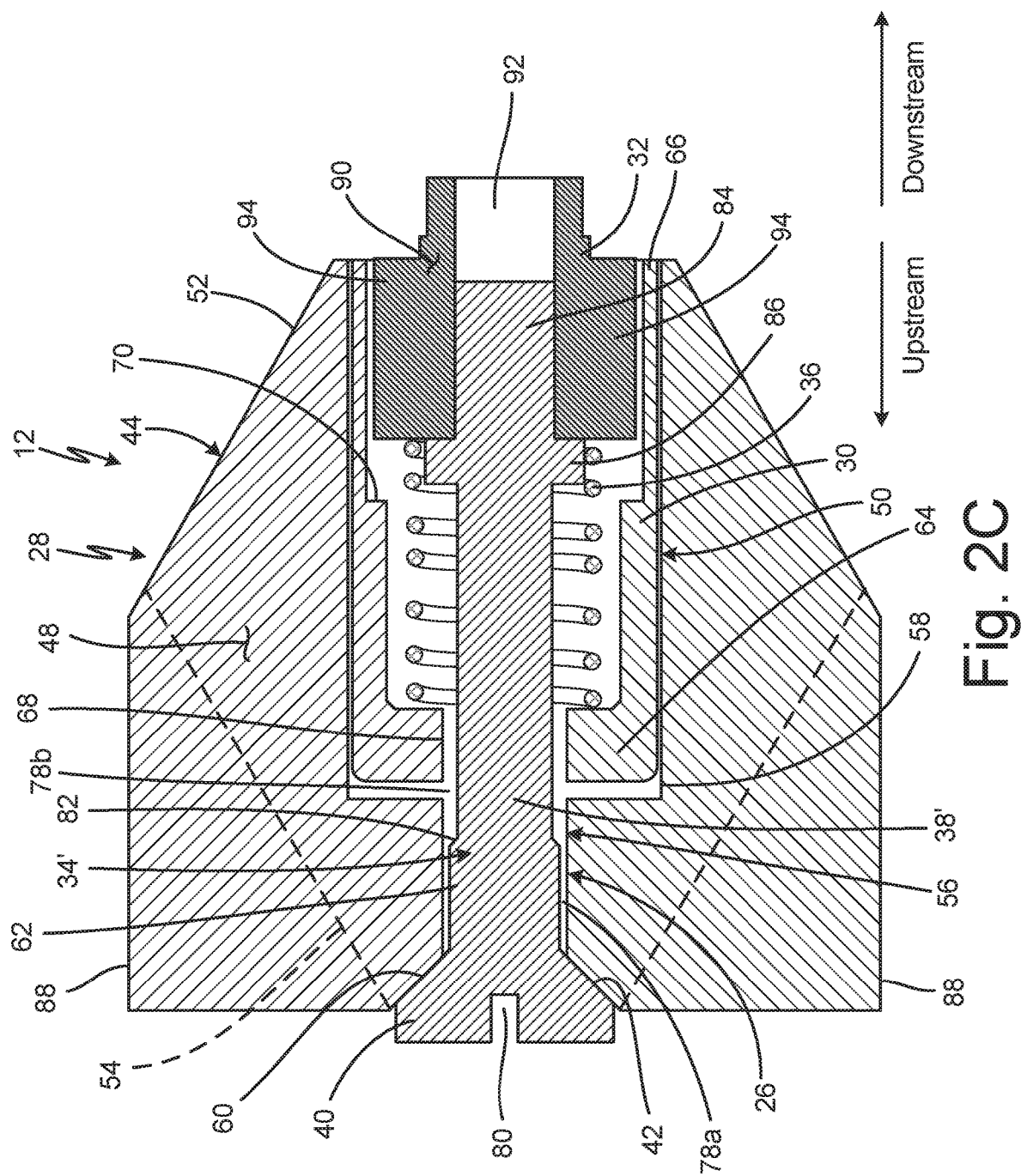
FIG. 2C is a cross-sectional view of the variable flow poppet valve of FIG. 2A.

FIG. 2A is an exploded view of VFPV 12. FIG. 2B is an end elevation view of VFPV 12. FIG. 2C is a cross-sectional view of VFPV 12. FIGS. 2A-2C will be discussed together. VFPV 12 includes first stage 26 (FIGS. 2A and 2C), second stage 28 (FIGS. 2A and 2C), bushing 30, and cap 32. First stage 26 includes inner valve plug 34', first stage spring 36 (FIGS. 2A and 2C), annular flowpath 78a (FIG. 2C), and annular flowpath 78b (FIG. 2C). Inner valve plug 34' includes shaft 38' (FIGS. 2A and 2C) and head 40 (FIGS. 2A and 2C), and head 40 includes first tapered surface 42 (FIGS. 2A and 2C) and slot 80 (FIGS. 2A and 2C). Shaft 38' includes step 82 (FIGS. 2A and 2C), attachment portion 84, and flange 86 (FIGS. 2A and 2C). Outer valve plug 44 of second stage 28 is shown. Outer valve plug 44 includes outer plug body 48 and plug passage 50. Outer plug body 48 includes second tapered surface 52, upstream portion 54 (FIGS. 2A and 2C), and vanes 88. Plug passage 50 includes first segment 56 (FIG. 2C) and second segment 58 (FIG. 2C). First segment 56 includes first stage seat 60 (FIG. 2C) and intermediate portion 62 (FIG. 2C). Bushing 30 includes upstream end 64 (FIGS. 2A and 2C), downstream end 66 (FIGS. 2A and 2C), shaft opening 68 (FIG. 2C), and shoulder 70 (FIGS. 2B and 2C). Cap 32 includes cap body 90, central bore 92, and ribs 94. Ribs 94 and bushing 30 define gaps 96 (FIG. 2B). The upstream arrow and the downstream arrow shown in FIG. 2C represent the upstream direction and the downstream direction, respectively.

Plug passage 50 extends through outer plug body 48. First segment 56 is disposed at an upstream end of plug passage 50 and second segment 58 is disposed at a downstream end of plug passage 50. First stage seat 60 is a chamfered portion of first segment 56 and is disposed at the upstream end of first segment 56. Intermediate portion 62 extends between and provides a flowpath between first stage seat 60 and second segment 58. Second segment 58 has a larger diameter than first segment 56. Bushing 30 extends into second segment 58 through a downstream end of second segment 58. Shoulder 70 extends radially inward from bushing 30. Shaft opening 68 extends through upstream end 64 of bushing 30.

Upstream portion 54 of outer valve plug 44 diverges radially in the downstream direction from first stage seat 60 to second tapered surface 52. Second tapered surface 52 converges in the downstream direction from upstream portion 54 to the downstream end of outer valve plug 44. Vanes 88 extend radially from upstream portion 54 and are configured to guide outer valve plug 44 within nozzle body 14 (FIGS. 1A-1D).

Inner valve plug 34' is disposed within plug passage 50. First tapered surface 42 of head 40 interfaces with first stage seat 60 when first stage 26 is in the closed position (best seen in FIG. 2C). Shaft 38' extends downstream from head 40 through intermediate portion 62, and shaft 38' extends into bushing 30 through shaft opening 68. Flange 86 extends radially from shaft 38' and is configured to abut an upstream end of cap 32 when inner valve plug 34' is attached to cap 32. Step 82 is disposed on shaft 38' between head 40 and flange 86 and provides a reduction in the cross-sectional area of shaft 38'. Annular flowpath 78*a* is disposed between the portion of shaft 38' upstream of step 82 and the inner wall of plug passage 50, and annular flowpath 78*b* is disposed between the portion of shaft 38' downstream of step 82 and the inner wall of plug passage 50. While inner valve plug 34' is shown as including a single step 82, it is understood that inner valve plug 34' can include as many or as few steps as desired to thereby provide greater flow control through first stage 26.

Attachment portion 84 is a portion of shaft 38' extending downstream from flange 86, and attachment portion 84 extends into central bore 92 of cap 32 to connect inner valve plug 34' and cap 32. In some examples, attachment portion 84 includes external threading and central bore 92 includes internal threading configured to mate with the external threading of attachment portion 84. It is understood, however, that attachment portion 84 can be secured within central bore 92 in any desired manner, such as by a press fit connection. In other examples, attachment portion 84 can be permanently secured within central bore 92, such as with an adhesive. Slot 80 extends into head 40 and is configured to facilitate connection of inner valve plug 34' and cap 32. For example, where attachment portion 84 and cap 32 include intermeshed threading, slot 80 allows the user to rotate inner valve plug 34' relative to cap 32 to facilitate the connection therebetween, such as with a screwdriver. Slot 80 can be configured for any desired drive configuration for facilitating attachment, such as slotted, Phillips®, Torx®, clutch, Pozidriv®, square, hex, or any other desired drive configuration.

Cap 32 extends into bushing 30 through downstream end 66 of bushing 30. Ribs 94 extend radially from cap body 90 and are configured to align cap 32 within bushing 30. In addition, ribs 94 define gaps 96 therebetween that provide flowpaths for the fluid to flow downstream out of first stage 26 of VFPV 12. Ribs 94 are further configured to engage shoulder 70 of bushing 30 to actuate second stage 28 between the closed position (shown in FIGS. 1B and 1C) and the open position (shown in FIG. 1D). The downstream end of central bore 92 is configured to receive a portion of push rod 24 (FIGS. 1A-1D) to secure cap 32 to push rod 24. For example, central bore 92 can include internal threading configured to mate with external threading on push rod 24. First stage spring 36 is disposed in bushing 30 and surrounds shaft 38' of inner valve plug 34'. First stage spring 36 extends between cap 32 and upstream end 64 of bushing 30.

During operation, first stage 26 is actuated to the open position prior to second stage 28 being actuated to the open position. To begin dispensing fluid, cap 32 is driven in the upstream direction, and cap 32 pushes inner valve plug 34' in the upstream direction and head 40 disengages from first stage seat 60. As cap 32 shifts upstream, first stage spring 36 is compressed between cap 32 and upstream end 64 of bushing 30. When head 40 disengages from first stage seat 60, a flowpath is opened between first tapered surface 42 and first stage seat 60 and the fluid begins flowing downstream through first stage 26. The fluid flows through the flowpath opened between first tapered surface 42 and first stage seat 60, downstream through intermediate portion 62 and enters bushing 30 though shaft opening 68. The fluid flows downstream through bushing 30 and exits VFPV 12 through gaps 96 disposed between ribs 94 of cap 32.

The user controls the flow rate through first stage 26 by controlling the distance that inner valve plug 34' is displaced in the upstream direction. As the distance between head 40 and first stage seat 60 increases the flow rate through first stage 26 similarly increases. Step 82 provides further flow rate control. Shaft 38' has a greater cross-sectional area upstream of step 82 and a smaller cross-sectional area downstream of step 82. As inner valve plug 34' shifts in the upstream direction the length of annular flowpath 78*a* decreases and the length of annular flowpath 78*b* increases. Decreasing the length of annular flowpath 78*a* while simultaneously increasing the length of annular flowpath 78*b* increases the flow rate through first stage 26, as annular flowpath 78*b* has a greater cross-sectional area than annular flowpath 78*a*. As such, step 82 provides the user with increased flow control and allows the user to further vary the flow rate by controlling the distance that inner valve plug 34' is displaced in the upstream direction. The user continues to displace cap 32, and thus inner valve plug 34', in the upstream direction until cap 32 engages shoulder 70, such as by ribs 94 engaging shoulder 70. With cap 32 engaging shoulder 70 first stage 26 is fully open.

The user can further increase the flow rate beyond the capacity of first stage 26 by actuating second stage 28 open. Cap 32 engages shoulder 70 and exerts a driving force on outer valve plug 44 through bushing 30. Cap 32 drives outer valve plug 44 in the upstream direction such that second tapered surface 52 disengages from second stage seat 76 (best seen in FIGS. 1B-1D). The user controls the flow rate through second stage 28 of VFPV 12 by controlling the distance that outer valve plug 44 is displaced from second stage seat 76. First stage 26 remains in the fully open position as second stage 28 is actuated between fully closed and fully open.

After the dispense event is complete, VFPV 12 shifts back to the fully closed position. Second stage spring 46 (FIGS. 1A-1D) drives outer valve plug 44 back to the closed position where second tapered surface 52 engages second stage seat 76. First stage spring 36 acts on cap 32 and drives cap 32, and thus inner valve plug 34', in the downstream direction until first tapered surface 42 engages first stage seat 60.

VFPV 12 provides significant advantages. Shifting first stage 26 open prior to shifting second stage 28 open creates a pressure drop on the upstream side of VFPV 12. The decreased pressure on the upstream side of VFPV 12 decreases the amount of force required to shift VFPV 12 to the fully open position, where both first stage 26 and second stage 28 are fully open. As the flow rate through first stage 26 increases the pressure on the upstream side of VFPV 12 decreases. The decreased pressure and decreased force required to actuate second stage 28 provides increased user control over the flow rate through VFPV 12. Step 82 provides increased flow control and flow variability through first stage 26. Decreasing the length of annular flow path 78*a* while increasing the length of annular flow path 78*b* increases the volume of the flowpath through intermediate portion 62. Increasing the volume of the flowpath increases the flow rate through first stage 26.

Figure 3:
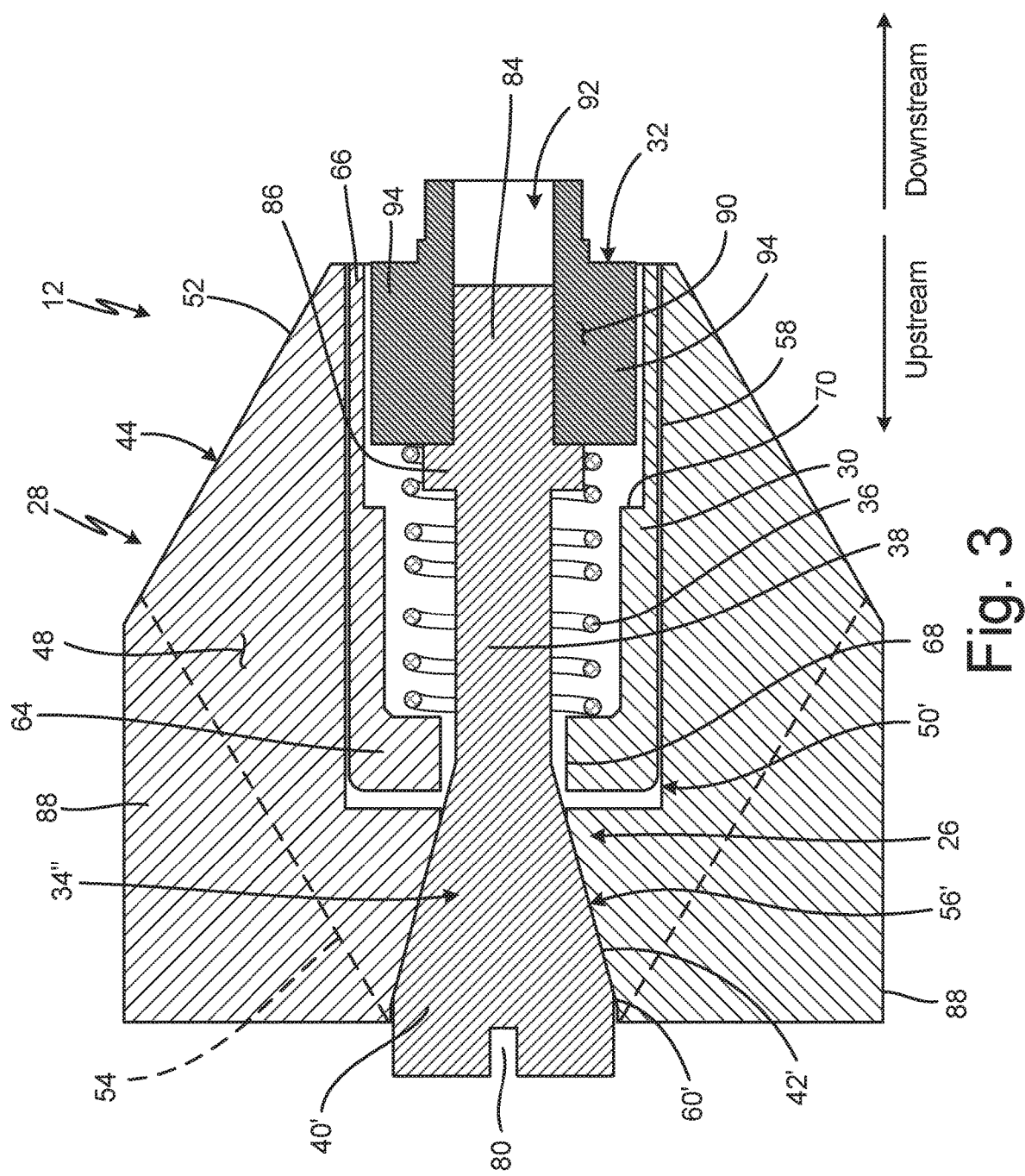
FIG. 3 is a cross-sectional view of another variable flow poppet valve.

FIG. 3 is a cross-sectional view of VFPV 12, which includes first stage 26, second stage 28, bushing 30, and cap 32. First stage 26 includes inner valve plug 34" and first stage spring 36. Inner valve plug 34" includes shaft 38 and head 40'. Head 40' includes first tapered surface 42' and slot 80. Shaft 38 includes attachment portion 84 and flange 86. Outer valve plug 44 of second stage 28 is shown. Outer valve plug 44 includes outer plug body 48 and plug passage 50'. Outer plug body 48 includes second tapered surface 52, upstream portion 54, and vanes 88. Plug passage 50' includes first segment 56' and second segment 58. First segment 56' includes first stage seat 60'. Bushing 30 includes upstream end 64, downstream end 66, shaft opening 68, and shoulder 70. Cap 32 includes cap body 90, central bore 92, and ribs 94. The upstream arrow and the downstream arrow represent the upstream direction and the downstream direction, respectively.

Upstream portion 54 of outer valve plug 44 diverges radially in the downstream direction from first stage seat 60' to second tapered surface 52. Second tapered surface 52 converges in the downstream direction from upstream portion 54 to the downstream end of outer valve plug 44. Vanes 88 extend radially from upstream portion 54 and are configured to guide outer valve plug 44 within nozzle body 14 (FIGS. 1A-1D).

Plug passage 50' extends through outer plug body 48. First segment 56' is disposed at an upstream end of plug passage 50' and second segment 58 is disposed at a downstream end of plug passage 50'. First stage seat 60' is a chamfered portion of first segment 56'. First stage seat 60' extends through the majority of first segment 56' such that the downstream end of first stage seat 60' is disposed proximate second segment 58. Bushing 30 is disposed within second segment 58 of plug passage 50'. Shoulder 70 extends radially inward from bushing 30. Shaft opening 68 extends through upstream end 64 of bushing 30 and disposed proximate the downstream end of first stage seat 60'.

Inner valve plug 34" is disposed within outer valve plug 44. Inner valve plug 34" extends through first stage seat 60' and into bushing 30 through shaft opening 68. First tapered surface 42' of head 40' is configured to abut first stage seat 60' when inner valve plug 34" is in the closed position. First tapered surface 42' extends downstream to an intersection with shaft 38. First tapered surface 42' and first stage seat 60' are elongate. First tapered surface 42' extends downstream beyond first stage seat 60' and into shaft opening 68 with inner valve plug 34" is in the closed position. Slot 80 extends into head 40' and is configured to facilitate connection of inner valve plug 34" and cap 32. Shaft 38 extends in the downstream direction from head 40' to cap 32. Attachment portion 84 extends into central bore 92 and secures inner valve plug 34" to cap 32. Flange 86 extends radially from shaft 38 and is configured to abut the upstream end of cap 32 when inner valve plug 34" is secured to cap 32.

Cap 32 extends into bushing 30 through downstream end 66 of bushing 30. Ribs 94 extend radially from cap body 90 and are configured to align cap 32 within bushing 30. In addition, ribs 94 define gaps 96 therebetween that provide flowpaths for the fluid to flow downstream out of first stage 26 of VFPV 12. Ribs 94 are further configured to engage shoulder 70 of bushing 30 to actuate second stage 28 between the closed position (shown in FIGS. 1B and 1C) and the open position (shown in FIG. 1D). The downstream end of central bore 92 is configured to receive a portion of push rod 24 (FIGS. 1A-1D) to secure cap 32 to push rod 24.

During operation, first stage 26 is actuated to the open position prior second stage 28 being actuated to the open position. To begin dispensing fluid, cap 32 is driven in the upstream direction, and cap 32 pushes inner valve plug 34" in the upstream direction such that head 40' disengages from first stage seat 60'. As cap 32 shifts upstream, first stage spring 36 is compressed between cap 32 and upstream end 64 of bushing 30. When head 40' disengages from first stage seat 60', a flowpath is opened between first tapered surface 42' and first stage seat 60' and the fluid begins flowing downstream through first stage 26. The fluid flows through the flowpath opened between first tapered surface 42' and first stage seat 60' and enters bushing 30 though shaft opening 68. The fluid flows downstream through bushing 30 and exits VFPV 12 through cap 32.

The profile of first tapered surface 42' and first stage seat 60' allows the user to variably control the flow rate through first stage 26. The further that head 40' is displaced away from first stage seat 60' the greater the volume of the flowpath that is opened between first tapered surface 42' and first stage seat 60'. As the volume of the flowpath increases, the flow rate through first stage 26 also increases. As such, the user varies the flow rate through first stage 26 by varying the distance between first tapered surface 42' and first stage seat 60'. The elongate profiles of first tapered surface 42' and first stage seat 60' define an elongate flowpath between first tapered surface 42' and first stage seat 60'. The elongate flowpath provides a greater variability in the flow rates that first stage 26 is capable of providing, and as such, the elongate profiles of first tapered surface 42' and first stage seat 60' provide the user with increased control of the flow rate through first stage 26.

The user can further increase the flow rate beyond the capacity of first stage 26 by actuating second stage 28 open. Cap 32 engages shoulder 70 of bushing 30 and exerts a driving force on outer valve plug 44 through bushing 30. Cap 32 drives outer valve plug 44 in the upstream direction such that second tapered surface 52 disengages from second stage seat 76 (best seen in FIGS. 1B-1D). The user controls the flow rate through second stage 28 of VFPV 12 by controlling the distance that outer valve plug 44 is displaced from second stage seat 76. First stage 26 remains in the fully open position as second stage 28 is actuated open.

After the dispense event is complete, VFPV 12 shifts back to the fully closed position. Second stage spring 46 (FIGS. 1A-1D) drives outer valve plug 44 back to the closed position where second tapered surface 52 engages second stage seat 76. First stage spring 36 acts on cap 32 and drives cap 32, and thus inner valve plug 34", in the downstream direction until first tapered surface 42' engages first stage seat 60'.

VFPV 12 provides significant advantages. First tapered surface 42' and first stage seat 60' are elongate and define an elongate flowpath therebetween. The elongate flow path allows the user to exert precise control over the flow rate through first stage 26. Actuating first stage 26 open prior to actuating second stage 28 open decreases the fluid pressure upstream of VFPV 12, thereby decreasing the force required to actuate second stage 28 open and increasing user control over actuation of second stage 28. In addition, first tapered surface 42' and second tapered surface 52 provide greater user control over the flow rate through VFPV 12.

Although the present invention has been described with reference to preferred embodiments, workers skilled in the art will recognize that changes may be made in form and detail without departing from the spirit and scope of the invention.

The invention claimed is:

1. A variable flow valve comprising:
   an outer valve plug comprising:
      a valve plug body having an upstream portion and an outer plug tapered portion extending from the upstream portion; and
      a plug passage extending through the valve plug body, the plug passage comprising:
         a first segment extending into the upstream portion of the valve plug body, the first segment including a first stage seat; and
         a second segment extending from the first segment;
   a bushing comprising:
      an upstream end having a shaft opening extending through the upstream end;

a downstream end; and
a shoulder extending radially inward and disposed between the upstream end and the downstream end;
wherein the bushing is disposed within the second segment;
an inner valve plug disposed within the plug passage and extending into the bushing through the shaft opening, the inner valve plug comprising:
a head having an inner plug tapered portion configured to mate with the first stage seat; and
a shaft extending from the head through the shaft opening; and
a cap attached to the shaft and disposed within the bushing;
wherein the cap is configured to actuate the inner valve plug between a first stage closed position and a first stage open position and is configured to engage the shoulder of the bushing to actuate the outer valve plug between a second stage closed position and a second stage open position.

2. The variable flow valve of claim 1, wherein the shaft further comprises a flange extending radially from the shaft and configured to abut an upstream end of the cap.

3. The variable flow valve of claim 2, wherein the inner valve plug further comprises an attachment portion extending from the flange and into a cap bore of the cap.

4. The variable flow valve of claim 1, wherein the first segment of the plug passage further comprises a intermediate portion extending between the first stage seat and the second segment.

5. The variable flow valve of claim 4, wherein the shaft includes a step, and wherein the shaft has a larger cross-sectional area between the head and the step than between the step and the cap.

6. The variable flow valve of claim 1, wherein the outer valve plug comprises an elastomer and the inner valve plug comprises a metal, and the inner plug tapered portion is configured to interface directly with the first stage seat with inner valve plug in the first stage closed position.

7. The variable flow valve of claim 1, wherein the cap comprises:
a cap body;
a cap bore extending through the cap body, the cap bore configured to receive the shaft of the inner valve plug; and
a plurality of ribs extending radially outward from the cap body.

8. The variable flow valve of claim 1, further comprising:
a first stage spring disposed within the bushing and around the shaft, the first stage spring extending between the upstream end of the bushing and the cap.

9. The variable flow valve of claim 1, wherein the upstream portion of the outer valve plug includes a plurality of vanes extending radially outward from the upstream portion.

10. A nozzle for dispensing fluid, the nozzle comprising:
a nozzle body defining an upstream fluid chamber and a downstream fluid chamber;
an outer valve seat extending radially inward from the nozzle body between the upstream fluid chamber and the downstream fluid chamber;
a variable flow valve disposed within the nozzle body, the variable flow valve movable between a fully closed position, a partially open position, and a fully open position, wherein the variable flow valve comprises:
an outer valve plug comprising:
a valve plug body having an upstream portion and an outer plug tapered portion extending from the upstream portion and configured to mate with the outer valve seat; and
a plug passage extending through the valve plug body and including a first stage seat;
a second stage spring disposed within the upstream fluid chamber and configured to bias the outer valve plug towards the outer valve seat;
a bushing disposed within the plug passage;
an inner valve plug disposed within the plug passage and extending into the bushing, the inner valve plug comprising:
a head having an inner plug tapered portion, the inner plug tapered portion configured to mate with the first stage seat; and
a shaft extending from the head and into the bushing;
a cap attached to the shaft and disposed within the bushing; and
a first stage spring disposed within the bushing and around the shaft, the first stage spring extending between an upstream end of the bushing and the cap;
wherein the cap is configured to actuate the variable flow valve from the fully closed position to the partially open position, where the inner valve plug is displaced from the first stage seat, and from the partially open position to the fully open position, where the outer valve plug is displaced from the outer valve seat.

11. The nozzle of claim 10, wherein the plug passage further comprises:
a first segment extending into the upstream portion of the valve plug body, the first segment including the first stage seat; and
a second segment extending from the first segment, wherein the bushing is disposed within the second segment.

12. The nozzle of claim 11, wherein the first segment of the plug passage further comprises a intermediate portion extending between the first stage seat and the second segment.

13. The nozzle of claim 12, wherein the shaft includes a step, and wherein the shaft has a larger cross-sectional area between the head and the step than between the step and the cap.

14. The nozzle of claim 10, wherein the bushing comprises:
an upstream end having a shaft opening extending through the upstream end, wherein the inner valve plug extends into the bushing through the shaft opening;
a downstream end; and
a shoulder extending radially inward and disposed between the upstream end and the downstream end.

15. The nozzle of claim 10, wherein a second stage seat is integral with the nozzle body.

16. The nozzle of claim 10, wherein:
the nozzle body and a second stage seat comprise a metal;
the outer valve plug comprises an elastomer;
the inner valve plug comprises a metal; and
the outer plug tapered portion is configured to interface directly with the second stage seat with the variable flow valve in the fully closed position and in the partially open position, and the inner plug tapered portion is configured to interface directly with the first stage seat with the variable flow valve in the fully closed position.

17. The nozzle of claim 10, wherein the shaft includes a flange extending radially from the shaft and configured to abut an upstream end of the cap.

18. The nozzle of claim 17, wherein the inner valve plug further comprises an attachment portion extending from the flange and into a cap bore of the cap.

19. The nozzle of claim 10, wherein the second stage spring has a higher spring rate than the first stage spring.

20. The nozzle of claim 10, further comprising:
- a trigger mounted on the nozzle body;
- a cam extending through the nozzle body and linked to the trigger; and
- a push rod disposed in the downstream fluid chamber and connected to the cap;
- wherein the trigger is configured to drive rotation of the cam, the cam is configured to displace the push rod towards the upstream fluid chamber, and the push rod is configured to displace the cap to actuate the variable flow valve from the fully closed position to the partially open position, and from the partially open position to the fully open position.

* * * * *